United States Patent
Kang et al.

(10) Patent No.: US 8,304,105 B2
(45) Date of Patent: Nov. 6, 2012

(54) ELECTROCHEMICAL CELL HAVING AN IMPROVED SAFETY

(75) Inventors: Hee Gyoung Kang, Cheonan-si (KR); Hyang Mok Lee, Daejeon (KR); Oh young Hyun, Daejeon (KR); Chang bum Ahn, Daejeon (KR)

(73) Assignee: LG Chem, Ltd. (KR)

( * ) Notice: Subject to any disclaimer, the term of this patent is extended or adjusted under 35 U.S.C. 154(b) by 2366 days.

(21) Appl. No.: 10/992,800

(22) Filed: Nov. 19, 2004

(65) Prior Publication Data

US 2005/0123827 A1 Jun. 9, 2005

(30) Foreign Application Priority Data

Nov. 21, 2003 (KR) .................. 10-2003-0083116

(51) Int. Cl.
*H01M 4/00* (2006.01)
*H01M 6/28* (2006.01)

(52) U.S. Cl. ..................... 429/128; 429/125

(58) Field of Classification Search .......... None
See application file for complete search history.

(56) References Cited

U.S. PATENT DOCUMENTS

| | | | | |
|---|---|---|---|---|
| 5,705,291 | A | 1/1998 | Amatucci et al. | 429/137 |
| 6,010,653 | A | 1/2000 | Menon | |
| 6,051,341 | A | 4/2000 | Terasaki | 429/234 |
| 6,074,776 | A | 6/2000 | Mao et al. | 429/61 |
| 6,383,680 | B1 * | 5/2002 | Hallifax et al. | 429/94 |
| 2003/0054245 | A1 | 3/2003 | Barton et al. | |
| 2004/0157124 | A1 * | 8/2004 | Goh et al. | 429/231.1 |

FOREIGN PATENT DOCUMENTS

| | | |
|---|---|---|
| JP | 62229663 A | 10/1987 |
| JP | 09-055210 | 2/1997 |
| JP | 11-016566 | 1/1999 |
| JP | 11-185758 | 7/1999 |
| JP | 2000-164206 | 6/2000 |
| JP | 2000-215909 | 8/2000 |
| JP | 2002110170 A | 4/2002 |
| JP | 2002313348 A | 10/2002 |
| KR | 1020010082059 A | 8/2001 |
| RU | 2046457 C1 | 10/1995 |

OTHER PUBLICATIONS

Brodd et al, New Rechargeable Polymer Battery Systems, (Cited in the 9th Annual Battery Conference on Advances and Application by Henry Oman, published in the IEEE AES Systems Magazine, Apr. 1994).*

9th Annual Battery Conference on Advances and Application by Henry Oman, published in the IEEE AES Systems Magazine, Apr. 1994.*

* cited by examiner

*Primary Examiner* — Barbara Gilliam
*Assistant Examiner* — Adam A Arciero
(74) *Attorney, Agent, or Firm* — Lerner, David, Littenberg, Krumholz & Mentlik, LLP

(57) ABSTRACT

Provided is a cell wherein out of electrodes constituting the cell, the outermost two electrodes are both cathodes, cathode current collectors of the cathodes are single-side coated with cathode active materials on the first surfaces thereof, other sides of cathode current collectors non-coated with cathode active materials are disposed toward the outside of a cell assembly and the thickness of cathode current collectors is 70 to 150% of that of the cathode active material coated layer. The cell in accordance with the present invention exhibits excellent safety in a nail penetration test.

3 Claims, 3 Drawing Sheets

ELECTROCHEMICAL CELL HAVING AN IMPROVED SAFETY

FIELD OF THE INVENTION

The present invention relates to an electrochemical cell having improved safety.

BACKGROUND OF THE INVENTION

An interest in energy storage technology has been increased. In particular, applications of electrochemical devices have been extended to portable telecommunication instruments such as compact mobile phones, camcorders and notebook computers, and further a power source for electric vehicles, and thereby efforts and attempts to research and develop such electrochemical devices are increasingly actualized. In this respect, the field of electrochemical energy storage devices has occupied a great deal of attention, and in particular, a lot of interest has been focused on the development of rechargeable secondary batteries.

Further, as a result of miniaturization and weight reduction of electric instruments, miniaturization and weight reduction of batteries used as a power source of the electronic instruments are also demanded. Therefore, recently, in order to increase capacity density of batteries, research and development for new designed batteries have been progressed.

Korean Patent Application No. 2001-5861 discloses a cell having a structure capable of maximizing content of electrode active material to prepare a small but high capacity cell, i.e., a stacked electrochemical cell having a structure including a plurality of stacked full cells or bicells and a separation film interposed between each stacked cell.

However, due to realization of high capacity of cells as described above, safety issues such as prevention of overcharge/over discharge and internal short-circuiting of cells have been increased. In particular, cell safety associated with overcharge of cells, hot box and nail penetration is a urgently resolved problem.

To improve the safety of cells, a method mounting a protective circuit and protective element on the cell or a method using heat blocking via a separator has been proposed. However, use of the protective circuit is greatly limited to realization of small and inexpensive battery packs, while a heat blocking mechanism by separator does not work effectively in many cases, when heat generation occurs abruptly.

Besides, a method using an organic electrolyte additive has been proposed, in order to resolve the problems associated with cell safety. For example, U.S. Pat. No. 6,074,776 discloses an example of preventing overcharge of cells by using a polymerizable monomer. In addition, Japanese Patent Laid-Open Publication No. 2000-215909 discloses an example of adding 1 to 10% by weight of branched polycyclic aromatic compounds and benzene compounds to an organic electrolyte solvent. However, use of the organic electrolyte additive may give rise to deterioration of cell performance.

Further, to prevent overcharge of cells, the different method is disclosed on Japanese Patent Laid-Open Publication No. 2000-164206. In accordance with this method, after carbon black as a conductive material and a binding agent are coated on a cathode current collector, then the mixed material of cathode active material and a binding agent are coated on that layer, such that when the cell is charged, resistance of the conductive material layer increases about 100 times, thus cutting-off current flow.

Alternatively, in order to improve cell safety, it was also disclosed to modify the surface of an electrode active material. Japanese Patent Laid-Open Publication No. Hei 9-55210 discloses a cathode active material prepared by coating lithium-nickel based oxides with alkoxides of Co, Al and Mn followed by heat treatment. Japanese Patent Laid-Open Publication No. Hei 11-16566 discloses lithium-based oxides coated with metals such as Ti, Sn, Bi, Cu, Si, Ga, W, Zr, B or Mo and oxides thereof. And also, Japanese Patent Laid-Open Publication No. Hei 11-185758 discloses a cathode active material prepared by coating a surface of lithium-manganese oxides with metal oxides using a co-precipitation method, followed by heat treatment.

However, the above-mentioned methods have failed to elevate an initial temperature at which the surface of the electrode active material reacts with the electrolyte, i.e., a temperature (a heat generation temperature) at which oxygen molecules combined with metals of the cathode active material are liberated, on overcharging the cell, and also have failed to decrease a heat value.

In addition, U.S. Pat. No. 5,705,291 discloses a method for increasing structural stability of a cathode active material, by coating the surface of the cathode active material with a composition containing borate, aluminate, silicate, or mixtures thereof, but this method still exhibits poor structural stability.

Therefore, in the field of battery technology, there remains a need to develop the technology for improving the safety of cells.

SUMMARY OF THE INVENTION

The present inventors have discovered that in a structure of the cell, the cell safety against penetration of a needle-shaped conductor such as a nail can be improved by disposing a cathode including a cathode current collector having a cathode active material coated on a single side thereof and having a thickness corresponding to 70 to 150% of that of a cathode active material coated layer, as the outermost electrode, so as to cover both outer surfaces of a cell assembly, and thus created the present invention based on this fact.

In accordance with the present invention, the above and other objects can be accomplished by the provision of a cell wherein out of electrodes constituting the cell, the outermost two electrodes are both cathodes, cathode current collectors of the cathodes are coated at a single side with cathode active materials on the first surfaces thereof, the second surfaces of the cathode current collectors non-coated with cathode active materials are disposed toward the outside of a cell assembly and the thickness of the cathode current collectors is 70 to 150% of that of the cathode active material coated layer.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in detail with reference to the preferred embodiments and the annexed drawings.

When performing evaluation testing of cell safety such as nail penetration, the main cause of cell explosion or combustion is high resistance heat due to currents conducted in a contact area between the cathode active materials and the anode active materials resulting from deformation of electrodes occurring upon conductor nail penetration. If the internal temperature of the cell increases over a critical point due to the resistance heat, an oxide structure of the cathode active materials collapse, thus resulting in thermal runaway, and thereby combustion or explosion of the cell is occurred.

Generally, since the cathode active material is an oxide, it has low electrical conductivity, and thus greater resistance as compared to the anode active material, while since a needle-shaped conductor such as a nail is a metal, it has very low resistance as compared to the cathode or anode active material. Therefore, in order to improve cell safety by lowering the resistance of a penetration region occurring upon nail penetration, lowering the resistance of the cathode active material is the most critical factor.

Therefore, the present inventors have found that the above-mentioned structural modification of the cell assembly can prevent direct contact between the nail and cathode active material occurring upon nail penetration, and thereby prevent increase of resistance due to direct contact between nail and cathode active material.

Figure 1:
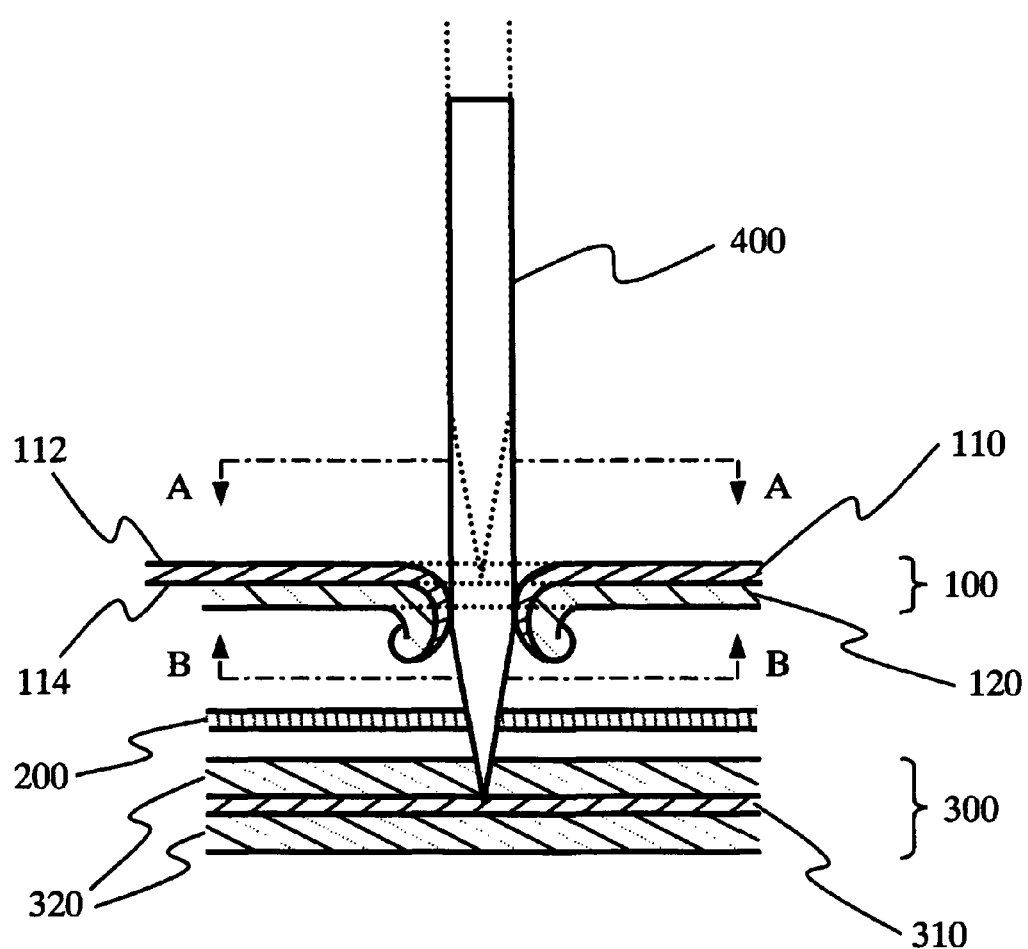
FIG. 1 is a partial cross-sectional view schematically showing the outermost part of a process that a cell is penetrated by a nail in accordance with the present invention.

Now, the present invention will be described in more detail with reference to FIG. 1 schematically showing the outermost part of a process that the nail penetrates in a structure of a cell in accordance with the present invention.

Referring to FIG. 1, in the cell in accordance with the present invention, the outermost electrode is a cathode 100, a current collector 110 of the cathode 100 is coated with active material 120 only on the inner surface thereof 114, but the outer surface thereof 112 is not coated with the active material 120. In contrast, an anode 300 oppositely facing the cathode, leaving a separator 200 between cathode and anode, is coated with an active material 320 on both sides of a current collector 310, respectively. For convenience of illustration in FIG. 1, the cathode 100, separator 200 and anode 300 are shown spaced apart from each other, (slightly) differing from their real structure.

Figure 2:
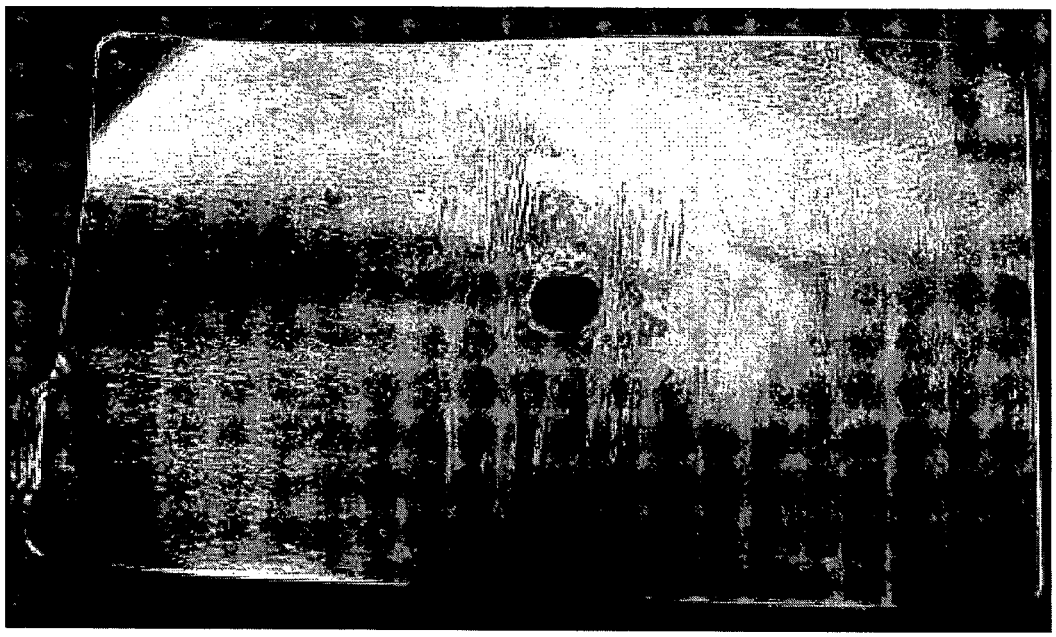
FIG. 2 is a photograph of a cathode taken along the line A-A in FIG. 1 after a nail penetration test on a cell in accordance with the present invention.
Figure 3:
FIG. 3 is a photograph of a cathode taken along the line B-B in FIG. 1 after a nail penetration test in a cell in accordance with the present invention.

When performing the nail penetration test on such a cell structure, as shown in FIG. 1, the nail 400 first contacts the outermost cathode current collector 110, and as penetration continues to progress, the cathode current collector 110 is bended downward due to entrance of the nail 400 and in turn, the cathode active material 120 coated on the inner surface 114 of the cathode current collector 110 also is bended. This is because the cathode current collector 110 made of generally ductile material (for example, aluminum) is bended in a penetration direction by downward force of the nail 400, thus being elongated by frictional contact with the nail 400 and thereby the active material 120 coated on the inner surface 114 of the cathode current collector 110 rolls inward. Therefore, even when the nail 400 reaches the separator 200 and the active material 320 coated on the anode 300, the cathode active material 120 having a high electric resistance will not directly contact the nail 400. FIGS. 2 and 3 show photographs of a deformed shape of the outermost cathode 100 after the penetration test, taken along the line "A-A" and the line "B-B" in FIG. 1, respectively. In particular, referring to FIG. 3, it can be confirmed that around the region through which the nail (not shown) penetrated, the outer surface of the cathode current collector on which the cathode active material was not coated was exposed downward. The black part represents the cathode active material in FIG. 3. Therefore, it is possible to provide further lower resistance as compared to when the nail directly contacts the cathode active material, thereby preventing the temperature inside the cell from increasing over the critical point, resulting in prevention of combustion and explosion of the cell.

Consequently, the cell of the present invention can secure cell safety without attachment of a separated safety device or addition of chemical additives and does not exhibit problems by the conventional arts as described above.

In the present invention, the outermost cathode current collector preferably has a thickness corresponding to 70 to 150% of that of the cathode active material coated layer. This is because if the thickness of the cathode current collector is less than 70% of that of the cathode active material coated layer, the cathode current collector does not undergo deformation as described above, and therefore the cathode active material having a high electric resistance will directly contact the nail. On the other hand, increasing the thickness of the current collector of the outermost cathode is advantageous in terms of cell safety, but if the thickness of the outermost cathode current collector exceeds 150% of that of the cathode active material coated layer, cell thickness and weight are significantly increased thus being undesirable, as compared to the other case when the thickness does not exceed 150% of that of the cathode active material coated layer.

The cell in accordance with the present invention may have a bicell structure composed of cathode/separator/anode/separator/cathode, but there is no particular limitation to constitution thereof. That is, preferably, the cell in accordance with the present invention may also have a structure including a plurality of full cells composed of cathode/separator/anode, or a plurality of bicells composed of cathode/separator/anode/separator/cathode or anode/separator/cathode/separator/anode sequentially stacked therein and a separator interposed between each stacked cell, as described in Korean Patent Application No. 2001-5861, the disclosure of which is incorporated by reference herein in its entirety.

EXAMPLES

Now, the present invention will be described in more detail with reference to the following Examples. These examples are provided only for illustrating the present invention and should not be construed as limiting the scope and sprit of the present invention.

Example 1

Preparation of a Stacked Cell Having a Single-Side Coated Cathode as the Outermost Electrode 1.1. Preparation of Cathode $LiCoO_2$, carbon black and PVDF, in a weight ratio of 95:2.5:2.5, were dispersed in NMP to prepare a slurry. The slurry thus obtained was coated on a sheet of aluminum foil, sufficiently dried at a temperature of 130° C. and then roll-pressed to prepare a cathode.

In this connection, the cathode, which is to be positioned on the outermost side of the outermost bicell, was coated with the slurry on one side of the aluminum foil only ("single side coating"), while the cathode of the bicell, which is to be positioned inside thereof, was coated with the slurry on both sides of the aluminum foil.

The aluminum foil, which is a cathode current collector in the single-side coated cathode, was made to have a thickness corresponding to 50%, 60%, 70%, 80%, 90% and 100% of that of the cathode active material coated layer, respectively. The thickness of the single-side coated cathode was made greater than 90 μm. The both-side coated cathode had a thickness of 140 μm.

1.2. Preparation of Anode

Graphite, acetylene black and PVDF, in a weight ratio of 94:1:5, were dispersed in NMP to prepare a slurry. The slurry thus obtained was coated on both sides of a copper current collector. This was followed by sufficient drying at a temperature of 80° C., and roll-pressed to prepare an anode. The both-side coated anode had a thickness of 138 μm.

1.3. Preparation of Separator: Separation Film: Polymer Film for Polyelectrolyte A multi-layer polymer film was prepared wherein a polypropylene film having a microporous structure and a thickness of 20 μm was a first polymer layer and a polyvinylidenefluoride-chlorotrifluoroethylene copolymer 32008 (commercially available from Solvay Polymer Corp., USA) was a second gelling polymer layer. That is, the above copolymer 32008 was dissolved to a concentration of 2 to 4% in acetone at a temperature of 50 to 60° C. The resulting transparent solution in which the copolymer 32008 was completely dissolved was coated on the both sides of the first polymer layer made of polypropylene by a conventional coating process. The thickness of coated copolymer 32008 was 1 μm and the thickness of final multi-layer polymer film was 22 μm.

1.4. Preparation of Internally Positioned Bicells

The cathode having the cathode active material coated on both sides of the cathode current collector was cut into a rectangle having a size of 3 cm×5 cm, excluding the area where a tab was to be formed. The anode having the anode active material coated on both sides of the anode current collector was cut into a rectangle having a size of 3.1 cm×5.1 cm, excluding the area where a tab was to be formed.

Bicells were prepared as follows: one bicell was prepared by placing the both-side coated anode in the middle and both-side coated cathode at both outer sides. Another bicell was prepared by placing the both-side coated cathode in the middle and both-side coated anode at both outer sides. At this time, these bicells were prepared by cutting the multi-layer polymer film prepared in Section 1.3 to a size of 3.2 cm×5.2 cm and interposing it between each cathode and anode, laminating cathodes and anodes by heat.

1.5. Preparation of the Outermost Side-Positioned Bicells

Bicells to be positioned on the outermost side were prepared as follows. Each of cathodes prepared in Section 1.1, having the cathode active material coated on single side and both sides thereof, respectively, was cut into a rectangle having a size of 3 cm×5 cm, excluding the area where a tab was to be formed. The anode having the anode active material coated on both sides thereof was cut into a rectangle having a size of 3.1 cm×5.1 cm, excluding the area where a tab was to be formed. The aforementioned single-side coated cathode, both-side coated anode and both-side coated cathode were sequentially stacked, and then the multi-layer polymer films in prepared Section 1.3, which were cut to a size of 3.2×5.2 cm, were interposed between electrodes. This was followed by heat bonding them to prepare bicells.

1.6. Stacking of Bicells

Bicells prepared as described above were sequentially stacked by interposing the aforementioned multi-layer polymer films between bicells.

1.7.1 Preparation of Battery

The battery of stacked bicells prepared as above was placed in an aluminum laminate packaging material and then a liquid electrolyte containing 1:2 weight ratio of EC/EMC of 1M $LiPF_6$ was injected and then packaged.

Comparative Example 1

Preparation of a Stacked Cell having a Single-Side Coated Anode as the Outermost Electrode A battery was prepared by performing the same procedure as in Example 1 except that the single-side coated anode was used as the outermost electrode.

Comparative Example 2

Preparation of a Stacked Cell Having a Both-Side Coated Cathode as the Outermost Electrode A battery was prepared by performing the same procedure as in Example 1 except that a both-side coated cathode was used as the outermost electrode.

Comparative Example 3

Preparation of a Stacked Cell Having a Both-Side Coated Anode as the Outermost Electrode A battery was prepared by performing the same procedure as in Example 1 except that a both-side coated anode was used as the outermost electrode.

Batteries prepared in Example 1 and Comparative Examples 1 through 3 were charged (CC-CV, 50 mA cut-off) to 4.2, 4.25, 4.3 and 4.35 V with electrical current corresponding to ½ C of cell capacity, respectively, and a nail penetration test was performed by penetrating an iron needle-shaped conductor having a diameter of 2.5 mm through cells. The number of samples according to respective conditions was the total of 30 and the test results were evaluated in terms of the number of samples which exploded during the nail penetration test. The test results are shown in Table 1 below.

TABLE 1

| Thickness of Current collector | Ex. 1 | | | | | | Comp. Ex. 1 | | | | | | Comp. Ex. 12 | Comp. Ex. 3 |
|---|---|---|---|---|---|---|---|---|---|---|---|---|---|---|
| (%)* | 50 | 60 | 70 | 80 | 90 | 100 | 50 | 60 | 70 | 80 | 90 | 100 | | |
| 4.20 V | 7 | 5 | 0 | 0 | 0 | 0 | 14 | 13 | 11 | 13 | 13 | 10 | 15 | 17 |
| 4.25 V | 8 | 8 | 0 | 0 | 0 | 0 | 16 | 17 | 17 | 16 | 19 | 15 | 16 | 17 |

TABLE 1-continued

| Thickness of Current collector | Ex. 1 | | | | | | Comp. Ex. 1 | | | | | | Comp. Ex. 12 | Comp. Ex. 3 |
|---|---|---|---|---|---|---|---|---|---|---|---|---|---|---|
| (%)* | 50 | 60 | 70 | 80 | 90 | 100 | 50 | 60 | 70 | 80 | 90 | 100 | | |
| 4.3 V | 10 | 9 | 0 | 0 | 0 | 0 | 15 | 17 | 18 | 17 | 15 | 16 | 14 | 18 |
| 4.35 V | 10 | 10 | 0 | 0 | 0 | 0 | 15 | 15 | 15 | 17 | 19 | 17 | 19 | 16 |

*(Thickness of the current collector of the outermost single-side coated electrode/Thickness of electrode active material coated layer) X 100

It was observed that cells in Comparative Examples were all exploded, while cells in Example 1 in accordance with the present invention did not explode except for cells having a current collector thickness of less than 70%.

As apparent from the above description, the cell in accordance with the present invention can realize improvement of cell safety by avoiding direct contact between cathode active material and needle-shaped conductor when performing a nail penetration test and thereby preventing combustion and explosion of the cell due to internal short-circuit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrochemical cell comprising:
electrodes forming the cell, wherein two outermost electrodes are both cathodes, cathode current collectors of the cathodes are single-side coated with cathode active materials on first surfaces thereof, other sides of the cathode current collectors which are non-coated with cathode active materials are disposed toward the outside of a cell assembly and thickness of the cathode current collectors of the two outermost electrodes is 70 to 150% of that of the cathode active material coated layer.

2. The electrochemical cell as set forth in claim 1, wherein the cell is a bicell composed of cathode/separator/anode/separator/cathode.

3. The electrochemical cell as set forth in claim 1, wherein the cell is a stacked cell of a structure including a plurality of full cells composed of cathode/separator/anode, a plurality of bicells composed of cathode/separator/anode/separator/cathode or anode/separator/cathode/separator/anode sequentially stacked, a separator interposed between each stacked full cells or bicells, and the outermost two electrodes of the stacked cell are both cathodes.

* * * * *